(12) United States Patent
Tomita et al.

(10) Patent No.: US 9,414,118 B2
(45) Date of Patent: Aug. 9, 2016

(54) CONTENT PROVISION DEVICE, CONTENT PROVISION METHOD, PROGRAM, INFORMATION STORAGE MEDIUM, BROADCASTING STATION DEVICE, AND DATA STRUCTURE

(71) Applicant: SONY COMPUTER ENTERTAINMENT INC., Tokyo (JP)

(72) Inventors: Hisashi Tomita, Tokyo (JP); Nobutoshi Koyama, Kanagawa (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 14/419,752

(22) PCT Filed: May 22, 2013

(86) PCT No.: PCT/JP2013/064212
§ 371 (c)(1),
(2) Date: Feb. 5, 2015

(87) PCT Pub. No.: WO2014/034195
PCT Pub. Date: Mar. 6, 2014

(65) Prior Publication Data
US 2015/0222952 A1    Aug. 6, 2015

(30) Foreign Application Priority Data
Aug. 30, 2012 (JP) ................................. 2012-190675

(51) Int. Cl.
*H04N 21/80* (2011.01)
*G06Q 30/02* (2012.01)
(Continued)

(52) U.S. Cl.
CPC ..... *H04N 21/4532* (2013.01); *H04N 21/23614* (2013.01); *H04N 21/26283* (2013.01);
(Continued)

(58) Field of Classification Search
USPC ....................................................... 725/10, 23
See application file for complete search history.

(56) References Cited

U.S. PATENT DOCUMENTS

| 2011/0069940 A1 | 3/2011 | Shimy et al. |
| 2013/0024882 A1* | 1/2013 | Lee .................... G06Q 30/0207 725/23 |

FOREIGN PATENT DOCUMENTS

| JP | 2007-274246 A | 10/2007 |
| JP | 2011-171903 A | 9/2011 |
| WO | 2010/102040 A1 | 9/2010 |

OTHER PUBLICATIONS

Translation of International Preliminary Report on Patentability dated Mar. 3, 2015 from corresponding Application No. PCT/JP2013/064212.
(Continued)

*Primary Examiner* — Kieu Oanh T Bui
(74) *Attorney, Agent, or Firm* — Katten Muchin Rosenman LLP

(57) ABSTRACT

To minimize possible adverse impact on a viewing posture of a user viewing video content, a main part, when additional content is provided to the user. A content provision device includes: viewing condition acquisition means for acquiring a viewing condition of a user viewing video content currently on air and appearing on a display; content provision means for providing, to the user, additional content different from the video content; and content control means for controlling provision of the additional content to the user by the additional content provision means based on the viewing condition.

10 Claims, 11 Drawing Sheets

(51) Int. Cl.
*H04N 21/45* (2011.01)
*H04N 21/442* (2011.01)
*H04N 21/4722* (2011.01)
*H04N 21/236* (2011.01)
*H04N 21/262* (2011.01)
*H04N 21/81* (2011.01)

(52) U.S. Cl.
CPC ... *H04N21/44213* (2013.01); *H04N 21/44218* (2013.01); *H04N 21/4722* (2013.01); *H04N 21/812* (2013.01)

(56) References Cited

OTHER PUBLICATIONS

International Search Report dated Aug. 20, 2013, from the corresponding PCT/JP2013/064212.

Japanese Notification of Reason for Refusal dated Jun. 7, 2016 from corresponding Application No. 2014-532834.

* cited by examiner

FIG. 2
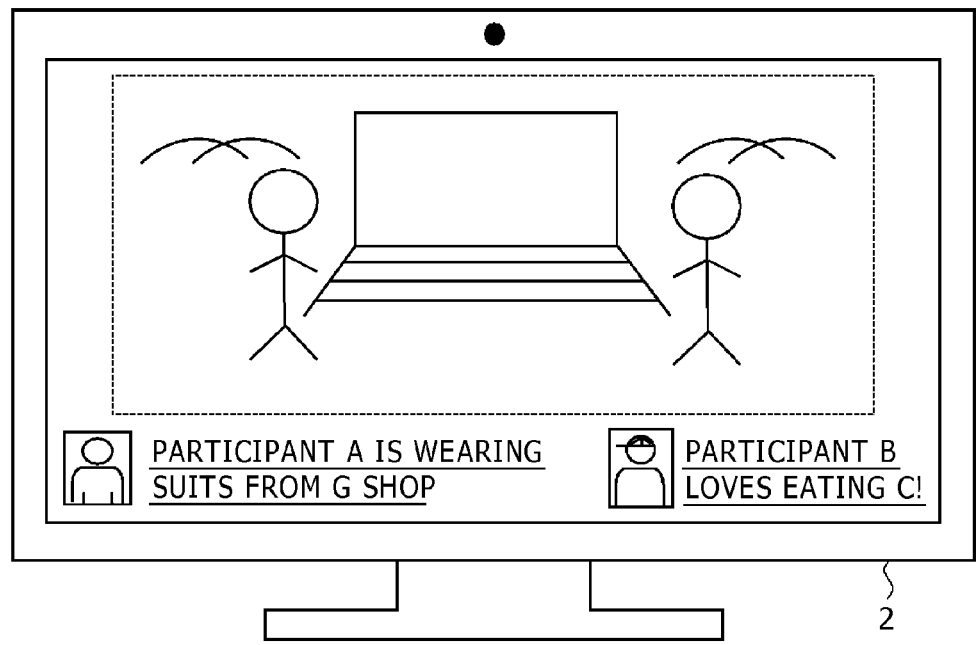
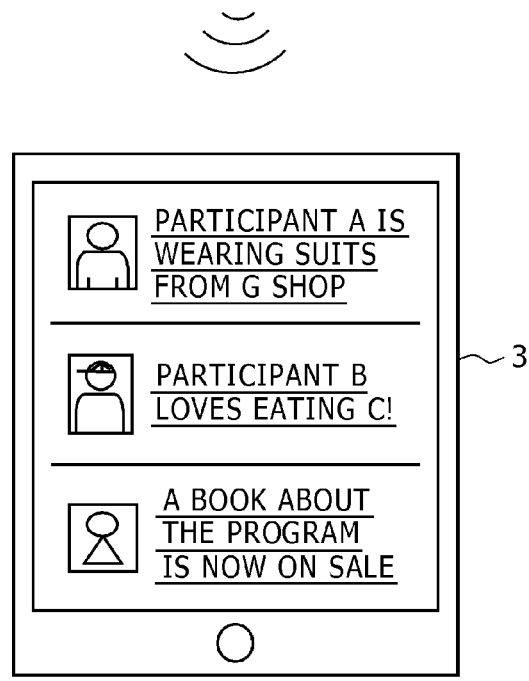

F I G . 3
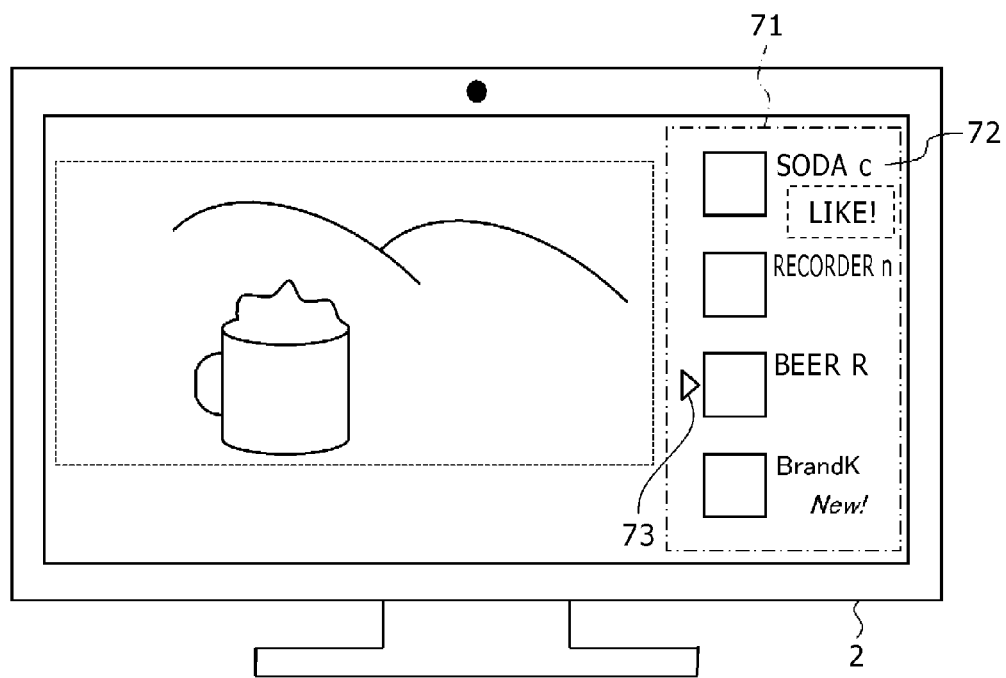
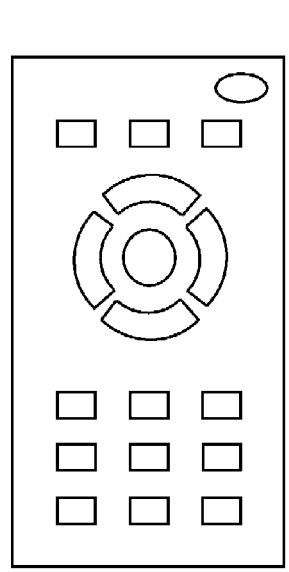

| START TIME | CM CODE | TITLE | URL1 | URL2 |
|---|---|---|---|---|
| 2012/9/1 12:00:00 | 1000123456 | RECORDER n | k.tv/b1c1m1 | k.tv/b1c1m2 |
| 2012/9/1 12:00:30 | 1000234567 | BEER R | k.tv/b1c2m1 | k.tv/b1c2m2 |

FIG.7

| TIME | MESSAGE | URL1 | URL2 |
|---|---|---|---|
| 2012/9/1 12:05:00 | PARTICIPANT A IS WEARING SUITS FROM G SHOP | k.tv/b1t1m1 | k.tv/b1t1m2 |
| 2012/9/1 12:05:21 | PARTICIPANT B LOVES EATING C! | k.tv/b1t2m1 | k.tv/b1t2m2 |

FIG.8

| TIME | EXPLANATORY NOTE |
|---|---|
| 2012/9/1 18:05:00 | FORWARD N SCORES GOAL! |
| 2012/9/1 12:05:21 | GOAL KEEPER G MAKES BRILLIANT SAVE! |

CONTENT PROVISION DEVICE, CONTENT PROVISION METHOD, PROGRAM, INFORMATION STORAGE MEDIUM, BROADCASTING STATION DEVICE, AND DATA STRUCTURE

TECHNICAL FIELD

The present invention relates to a content provision device, a content provision method, a program, an information storage medium, a broadcasting station device, and a data structure.

BACKGROUND ART

Today, additional content—primarily text acquired through data broadcasting and communication with servers (e.g., content called tickers)—is increasingly shown on the TV screens as an addition to video content of TV programs. Further, CM content is commonly aired during the breaks of video content, main feature content, in TV broadcasting. Viewers go to the bath rooms or browse information using other means such as their smartphones while CM content is playing. As a result, it is not rare that CM content is not viewed.

SUMMARY

Technical Problem

When information is provided to users using additional content, the concentration of the users on the video content of the program, the main part, declines if they watch the additional content. As a result, it is likely that the users may be less satisfied with the video content of the program or that the substantial audience rating may go down.

In light of the foregoing, it is an object of the present invention to provide a technology for minimizing possible adverse impact on a viewing posture of a user viewing video content, the main part, when additional content is provided to the user.

Solution to Problem

In order to solve the above problem, a content provision device according to the present invention includes viewing condition acquisition means, content provision means, and content control means. The viewing condition acquisition means acquires a viewing condition of a user viewing video content currently on air and appearing on a display. The content provision means provides, to the user, additional content different from the video content. The content control means controls provision of the additional content to the user by the content provision means based on the viewing condition.

Further, a program according to the present invention causes a computer to function as viewing condition acquisition means, content provision means, and content control means. The viewing condition acquisition means acquires the condition of a user viewing video content currently on air and appearing on a display. The content provision means provides, to the user, additional content different from the video content. The content control means controls provision of the additional content to the user by the content provision means based on the viewing condition.

Still further, a computer-readable storage medium according to the present invention stores the above program.

Still further, a content provision method according to the present invention includes a step of acquiring a viewing condition of a user viewing video content currently on air and appearing on a display. The content provision method further includes a step of providing, to the user, additional content different from the video content. The content provision method still further includes a step of controlling the step of providing the additional content to the user based on the viewing condition.

The present invention minimizes possible adverse impact on a viewing posture of a user viewing video content, the main part, when additional content is provided to the user.

In one mode of the present invention, the content provision device may further include additional content acquisition means for acquiring, as additional content, information representing a plurality of sentences, each associated with one of a plurality of other pieces of content. The viewing condition acquisition means may detect whether or not the user is in front of the display. The content control means may select one of the plurality of pieces of content that is associated with the sentence selected by the user of all the plurality of sentences based on whether or not the content provision device is located in front of the display. The content control means may also control the content provision device in such a manner as to provide, to the user, the selected piece of content as additional content.

In the mode of the present invention, the additional content acquisition means may acquire the information representing the plurality of sentences transferred by a device configured to demodulate a broadcasting signal that is transmitted by radio waves and that includes the video content and the information representing the plurality of sentences.

In the mode of the present invention, each of the plurality of sentences may be also associated with time. The content control means may exercise control so that the plurality of sentences are provided to the user based on the associated times.

In the mode of the present invention, the viewing condition acquisition means may detect whether or not the user is browsing content other than the video content currently on the air. The content control means may exercise control so that the additional content is provided to the user if the user is browsing the content other than the video content currently on the air.

In the mode of the present invention, the viewing condition acquisition means may detect whether the user has finished browsing the content other than the video content currently on the air. The content control means may exercise control so that information outlining the video content currently on the air is provided to the user as additional content if the user has finished browsing the content other than the video content currently on the air.

Further, a broadcasting station device according to the present invention includes means for acquiring video content to be broadcast. The broadcasting station device further includes means for acquiring information representing a plurality of sentences, each associated with one of a plurality of other pieces of content. The broadcasting station device still further includes means for generating a broadcasting signal that includes the video content and the information representing the plurality of sentences. The broadcasting station device still further includes transmission means for transmitting the broadcasting signal to a device configured to provide the video content.

Still further, a data structure according to the present invention includes video content and additional content that includes a plurality of sentences, each associated with one of a plurality of other pieces of content.

BRIEF DESCRIPTION OF DRAWINGS

FIG. 2 is a diagram illustrating an example of a case in which tickers are displayed on a TV set or a mobile terminal.

FIG. 3 is a diagram illustrating an example of a case in which a CM list is displayed on a TV set.

FIG. 7 is a diagram illustrating an example of ticker information.

FIG. 8 is a diagram illustrating an example of plot summary information.

DESCRIPTION OF EMBODIMENTS

A description will be given below of an embodiment of the present invention based on the accompanying drawings. A description will be given first of the outline of a broadcasting system.

Figure 1:
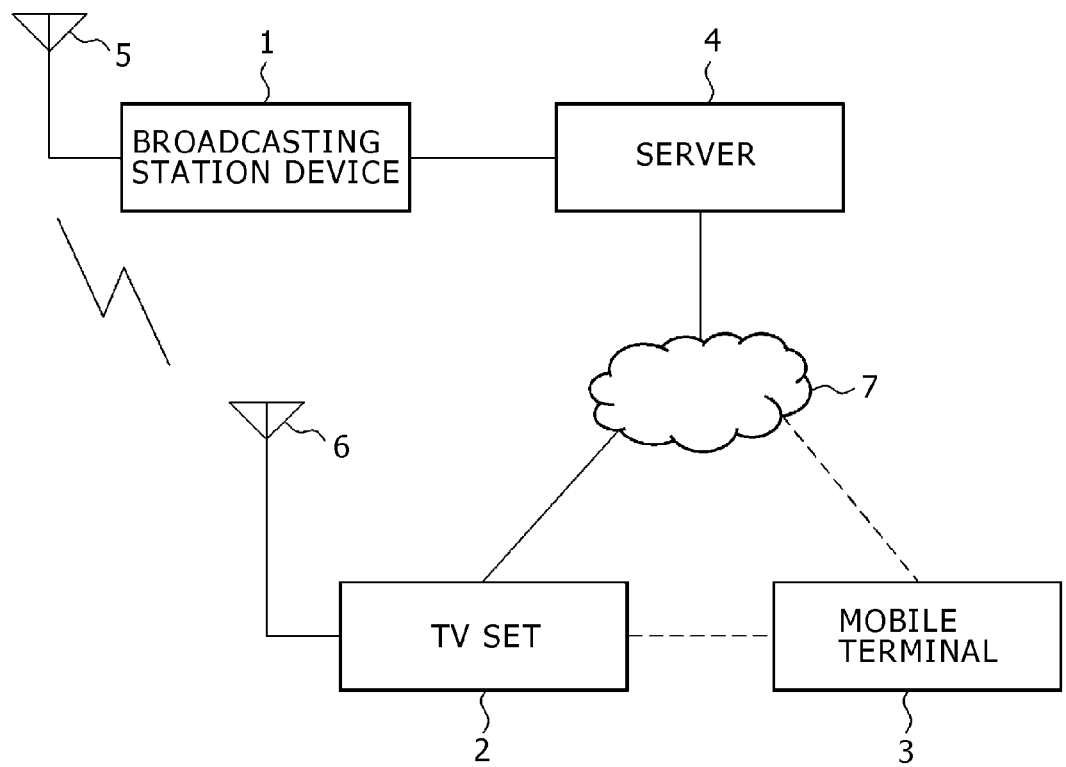
FIG. 1 is a diagram illustrating an example of configuration of a broadcasting system according to an embodiment of the present invention.

FIG. 1 is a diagram illustrating an example of configuration of the broadcasting system according to an embodiment of the present invention. This broadcasting system includes a broadcasting station device 1, a TV set 2, a mobile terminal 3, a server 4, a transmitting antenna 5, and a receiving antenna 6. The broadcasting station device 1 is provided at a broadcasting station that broadcasts TV programs. The broadcasting station device 1 is connected to the transmitting antenna 5. The TV set 2 is provided, for example, at a home of a user (viewer) who views TV programs. The TV set 2 is connected to the receiving antenna 6. The mobile terminal 3, usually carried by the user, is more specifically a smartphone, a mobile phone, a tablet terminal or the like.

The mobile terminal 3 is associated in advance with the TV set 2 in one way or another. For example, the TV set 2 stores information configured to identify the mobile terminal 3 in a network (e.g., MAC address or IP address). The mobile terminal 3 also stores information configured to identify the TV set 2. The server 4 is provided at a broadcasting station or data center. The server 4, the TV set 2, and the mobile terminal 3 are connected to an Internet 7.

Video content, which is content that accounts for the major part of content to be broadcast by a broadcasting station, is converted to a broadcasting signal by the broadcasting station device 1 and broadcast as a wireless signal via the transmitting antenna 5. Here, video content is movies with sounds. The receiving antenna 6 receives the broadcasting signal, and the TV set 2 plays the video content decoded from the broadcasting signal. Further, the TV set 2 and the mobile terminal 3 can communicate bidirectionally with each other using, for example, a wireless LAN.

On the other hand, additional content different from the video content (hereinafter denoted as "additional content") is delivered to the TV set 2 in one of two ways described below. First, additional content is embedded in a broadcasting signal and delivered by radio waves. In the first way, the broadcasting station device 1 converts video content and additional content together to a broadcasting signal and transmits the broadcasting signal, and the TV set 2 acquires the additional content from the received broadcasting signal. Further, the TV set 2 transfers the additional content to the mobile terminal 3, for example, through wireless communication. Second, additional content is delivered via an existing network such as the Internet 7. In the second way, the broadcasting system of the broadcasting station uploads data of the additional content to be delivered to the server 4. The TV set 2 and the mobile terminal 3 download the additional content from the server 4 as necessary.

Ticker information, plot summary information, and CM list information are among additional content delivered by a broadcasting station. Ticker information refers to message information relating to main feature content. Plot summary information describes the plot summary of the main feature content. Here, the main feature content is part of the video content, and the video content includes the main feature content and the CM content. The main feature content is that of a program created by the broadcasting station, whereas the CM content is advertisement content broadcast during the intervals of the main feature content. Further, the additional content need not necessarily be delivered by the broadcasting station. The broadcasting station may deliver a link to the additional content so that the server of the content provider is accessed if the link to the additional content is selected. Still further, the broadcasting station may deliver, as other additional content such as ticker information, information itself including the link to that additional content.

The TV set 2 and the mobile terminal 3 display the delivered additional content on their screens. FIG. 2 is a diagram illustrating an example of a case in which tickers are displayed on the TV set 2 or the mobile terminal 3. In the example shown in FIG. 2, the video content, the main part, appears in part of the display area of the TV set 2. A plurality of messages appear to scroll from right to left in the lower part of the video content display area as ticker information. Further, the mobile terminal 3 has already acquired the ticker information via the TV set 2 or the Internet 7 and displays, on its screen, the messages, ticker information, in such a manner as to scroll from top to bottom (or bottom to top). Still further, links to other pieces of content are embedded in these messages. As a result, if a viewer selects one of the links, he or she can browse the content associated with the message. The user does not feel uncomfortable about browsing messages that scroll over time or selecting a link on the mobile terminal 3. This configuration makes it easier to guide the user to the associated content.

FIG. 3 is a diagram illustrating an example of a case in which a CM list is displayed on the TV set 2. A CM list 71 represented by CM list information appears on the right side of the display screen of the TV set 2. The CM list 71 is a list of CM content titles 72 that were or will be aired. The "CM list 71" column shows not only information about the titles 72 of content that was aired in the past but also information about the titles 72 of content that will be aired. A current selection symbol 73, a triangular mark, appears on the left of the CM list 71 in FIG. 3. The current selection symbol 73 indicates that the CM title marked with the current selection symbol 73 is the title of the CM content played on the left-side area of the CM list 71. The titles in the CM list 71 scroll up in this example when the pieces of CM content to be aired change.

When the user checks a CM about which he or she is curious, for example, by pressing a button on the remote control, the title 72 of the checked CM is marked with a "Like!" symbol or other symbol, thus allowing the user to browse information relating to that CM later. The user can learn about past and future CM content by scrolling the CM list 71 up and down. Thus, by allowing a viewer to select a CM or browse the CM list 71, it is possible to arouse the interest of the viewer about CMs and permit him or her to more positively acquire information about the product advertised by the CM about which he or she is curious, thus contributing to enhanced advertising effect.

Here, the additional content, while on one hand contributing to the above effect, may lessen the concentration of the user on the video content itself. In order to deal with this, the TV set 2 and the mobile terminal 3 control the manner in which additional content is displayed in accordance with the user's viewing condition. A detailed description will be given below of the process performed by the broadcasting system including controlling the display of additional content.

Figure 4:
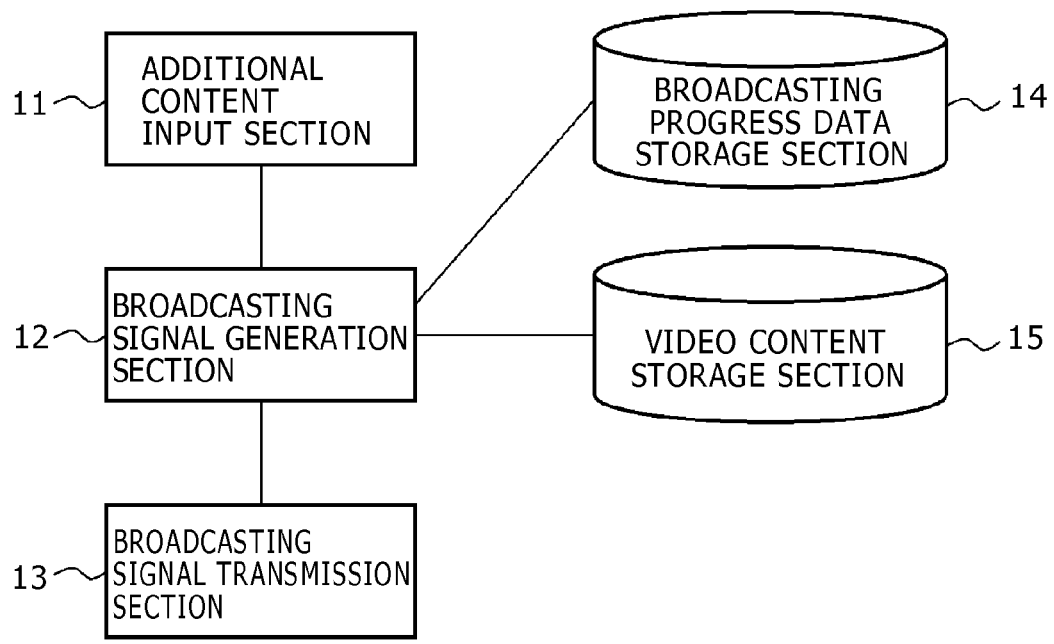
FIG. 4 is a diagram illustrating an example of configuration of a broadcasting station device.

FIG. 4 is a diagram illustrating an example of configuration of the broadcasting station device 1. The broadcasting station device 1 includes an additional content input section 11, a broadcasting signal generation section 12, a broadcasting signal transmission section 13, a broadcasting progress data storage section 14, and a video content storage section 15.

The broadcasting progress data storage section 14 includes external storage means such as harddisk drive and a memory element and stores broadcasting progress data generated by an unshown commercial broadcasting system provided at a broadcasting station. The term "broadcasting progress data" refers to information indicating the progress of video content aired by a broadcasting station over time. This information includes, in order of airing, indices of a plurality of pieces of main feature content and a plurality of pieces of CM content making up a program. More specifically, broadcasting progress data has a plurality of records, each of which includes a period made up of start and end times, a flag indicating whether main feature content or CM content is to be aired during that period, CM code of the CM content, a link to the substance of the main feature content, and so on. The video content storage section 15 includes external storage means and a memory element and stores main feature content and CM content.

Figures 5, 6:
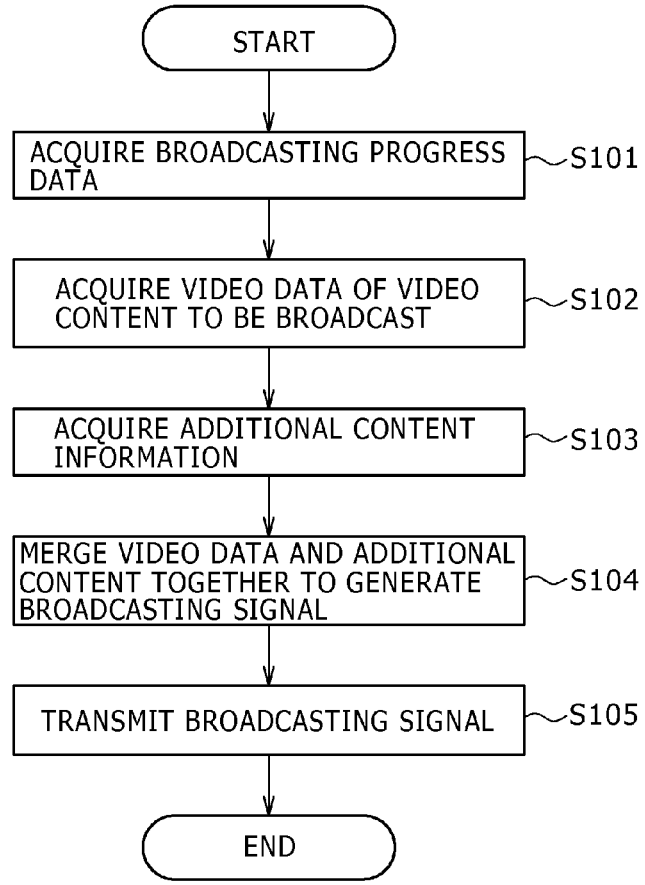
FIG. 5 is a diagram illustrating an example of a processing flow of the broadcasting station device.
FIG. 6 is a diagram illustrating an example of CM list information.

FIG. 5 is a diagram illustrating an example of a processing flow of the broadcasting station device 1. A description will be given below of the functions of the additional content input section 11, the broadcasting signal generation section 12, and the broadcasting signal transmission section 13 with reference to the processing flow shown in FIG. 5.

The broadcasting signal generation section 12 is implemented by computer and signal processing hardware, converting main feature content, CM content data and additional content data corresponding to broadcasting time to a broadcasting signal. More specifically, the broadcasting signal generation section 12 acquires broadcasting progress data from the broadcasting progress data storage section 14 first (step S101).

Next, the broadcasting signal generation section 12 acquires, from the video content storage section 15, data of video content (main feature content or CM content) to be aired in real time in accordance with the broadcasting time based on the broadcasting progress data (step S102). It should be noted that a CM code configured to identify CM content is embedded in the CM content data itself. The process performed from this point onward by the broadcasting signal generation section 12 will be described after describing the process performed by the additional content input section 11.

The additional content input section 11 includes input means such as keyboard, a computer, and so on and acquires information about additional content (step S103). More specifically, the additional content input section 11 acquires, via the input means, information about additional content entered by an operator by manipulating the keyboard. The additional content input section 11 also acquires information about additional content that is prepared in advance and stored in storage means by reading the information from the storage means.

As described earlier, CM list information, ticker information, and plot summary information are among additional content information. FIGS. 6, 7, and 8 are diagrams illustrating examples of CM list information, ticker information, and plot summary information, respectively.

CM list information is a list of outlines such as titles of CM content aired by a broadcasting station. More specifically, CM list information is information about outlines of one or a plurality of pieces of CM content aired during a given period of time prior to broadcasting and outlines of a plurality of pieces of CM content which will be aired for a given period of time in the future (e.g., 24-hour period from the current time). The outline of a piece of CM content includes, for example, the broadcasting start time of the CM content, text information indicating, for example, the CM code of the CM content, the title of the CM content, the URL used to acquire additional information about the CM content. In FIG. 6, two kinds of URLs are shown. A description will be given later of how a plurality of URLs are used. It should be noted that the broadcasting schedule of CM content tends to change often up to the last minute of the broadcasting. Therefore, CM list information acquired by the broadcasting station device 1 is updated regularly.

Ticker information is information about a plurality of messages relating to main feature content and has a record for each message. Each record has, for example, the time when the ticker is to be displayed on the screen, the message text to be displayed, and two kinds of URLs used to acquire additional information to be provided when the message is clicked.

Plot summary information is information indicating the plot summary of the main feature content currently on the air up to that point in time and is made up of a plurality of explanatory notes, each associated with time. In the case of a live sport broadcast, only past plot summary information about the main feature content is available. In the case of a drama or other content prepared in advance, however, plot summary information may include information about the future plot from the time of airing.

When additional content is acquired, the broadcasting signal generation section 12 merges video content data and additional content data together to generate broadcasting data. Further, the broadcasting signal generation section 12 converts the broadcasting data to a digital broadcasting format, thus generating a broadcasting signal (step S104).

The broadcasting signal transmission section 13 transmits the broadcasting signal to the TV set 2 located in the broadcasting area using the transmitting antenna 5.

The additional content input section 11 included in the broadcasting station device 1 acquires the additional content on a regular basis. The broadcasting signal generation section 12 and the broadcasting signal transmission section 13 deliver the additional content on a regular basis. The reason for this is that because the TV set 2 is unable to acquire the additional content at all times, for example, because of channel changes, it is necessary to ensure that the TV set 2 can acquire the additional content at latest before a given amount of time elapses after a channel change. It should be noted that the broadcasting station device 1 may upload the additional content information to the server 4 on a regular basis rather than delivering the additional content information to the broadcasting signal.

A description will be given next of the TV set 2 and the mobile terminal 3 that are activated in response to the receipt of video content transmitted from a broadcasting station and additional content delivered therefrom.

Figure 9:
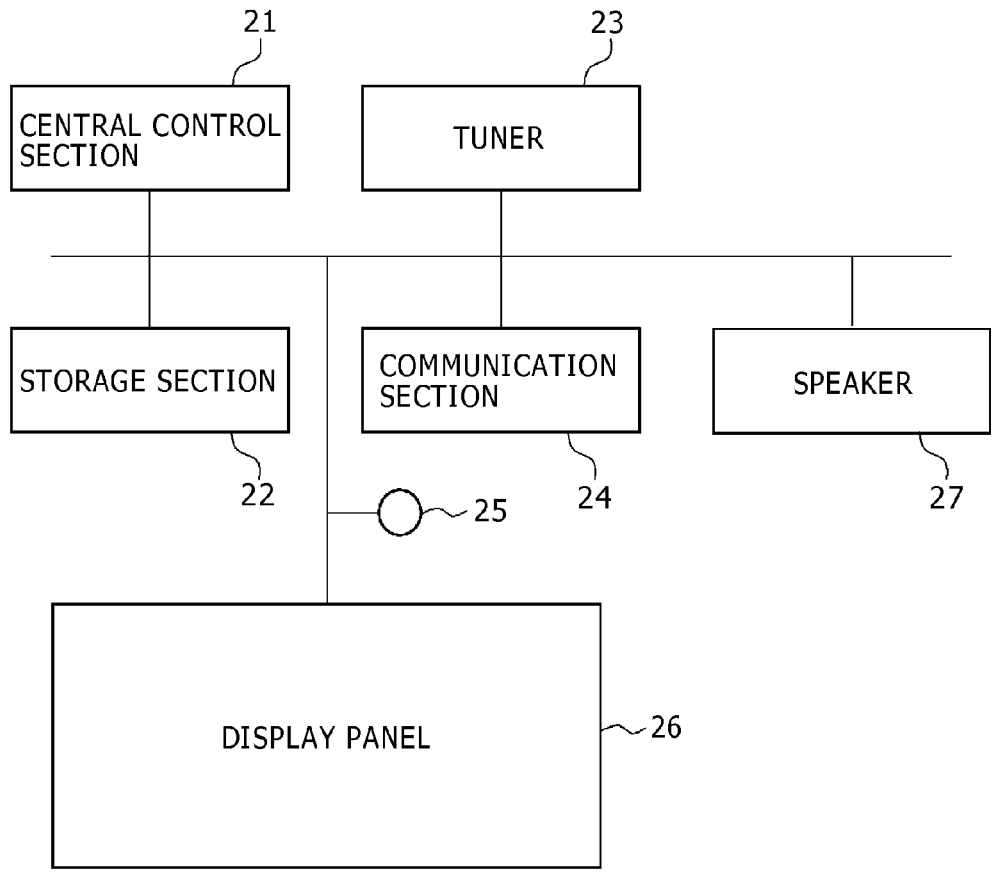
FIG. 9 is a diagram illustrating an example of configuration of a TV set.

FIG. 9 is a diagram illustrating an example of configuration of the TV set 2. The TV set 2 includes a central control section 21, a storage section 22, a tuner 23, a communication section 24, a camera 25, a display panel 26, and a speaker 27.

The central control section 21 operates in accordance with the program stored in the storage section 22, controlling the tuner 23 and the communication section 24. It should be noted that the program may be supplied in a manner stored in a computer-readable storage medium such as flash memory. Alternatively, the program may be supplied via a network such as the Internet 7 or by radio waves.

The storage section 22 includes, for example, memory elements such as RAM and flash memory. The storage section 22 stores the above program. Further, the storage section 22 stores information entered from various sections and arithmetic operation results.

The tuner 23 acquires a broadcasting signal transmitted by ground waves or satellite waves via the receiving antenna 6. The tuner 23 may acquire a broadcasting signal via a wired communication network such as cable TV network. The tuner 23 decodes the acquired broadcasting signal, outputting video content data including CM content and additional content data.

The communication section 24 includes ICs, terminals, antennas, and so on making up a wired or wireless LAN. The communication section 24 has a function to communicate not only with other devices but also with the server 4 via the Internet 7. The communication section 24 supplies information received from other devices to the central control section 21 and the storage section 22 under control of the central control section 21. The communication section 24 also transmits information to other devices.

The camera 25 is attached to the front face of the TV set 2 to capture the viewer in front of the TV set 2. The image of the captured viewer is used for analysis of the viewing condition which will be described later. The display panel 26 is a device configured to display the movie of video content.

Figure 10:
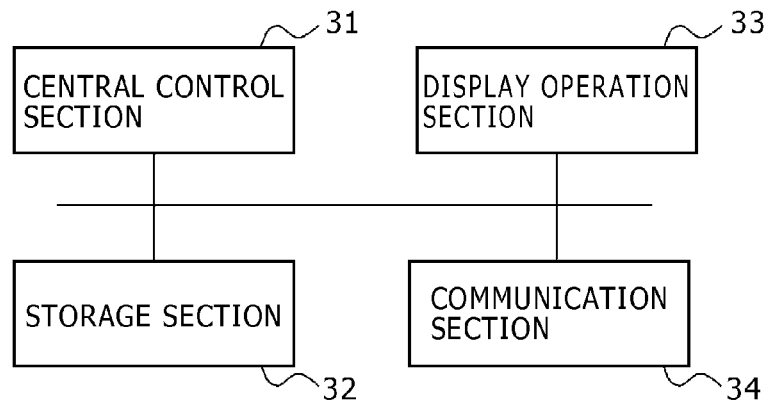
FIG. 10 is a diagram illustrating an example of configuration of a mobile terminal.

FIG. 10 is a diagram illustrating an example of configuration of the mobile terminal 3. The mobile terminal 3 includes a central control section 31, a storage section 32, a display operation section 33, and a communication section 34. The central control section 31, the storage section 32, and the communication section 34 are respectively similar to the central control section 21, the storage section 22, and the communication section 24. It should be noted, however, that the central control section 31, the storage section 32, and the communication section 34 differ from their counterparts in that they are designed, for example, to save power so as to be driven by battery, and in that the communication section 34 includes ICs and an antenna for communication via a wireless LAN or mobile phone network.

The display operation section 33 includes means for controlling a display output device such as LCD panel and means for controlling input devices such as touch panel and remote control. The display operation section 33 outputs, for example, image data to the display output device and acquires information from the operator (user) from the input device under control of the central control section 31.

Figure 11:
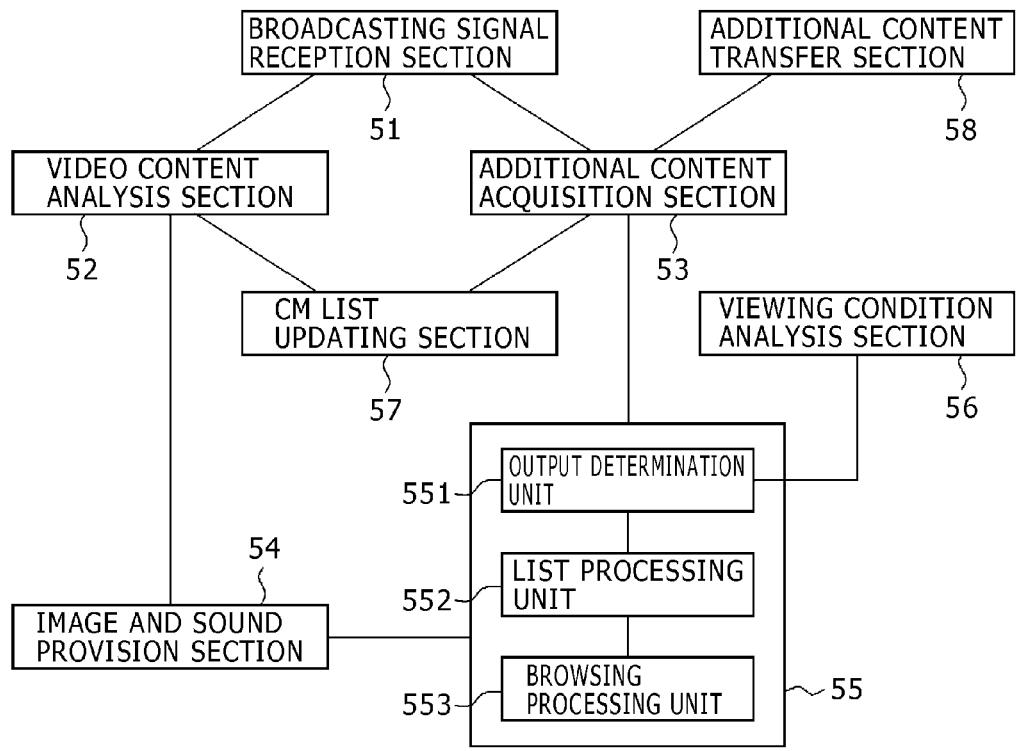
FIG. 11 is a block diagram illustrating an example of configuration of functions achieved by the TV set.

FIG. 11 is a block diagram illustrating an example of configuration of functions achieved by the TV set 2. The TV set 2 functionally includes a broadcasting signal reception section 51, a video content analysis section 52, an additional content acquisition section 53, an image and sound provision section 54, an additional content output control section 55, a viewing condition analysis section 56, a CM list updating section 57, and an additional content transfer section 58. Further, the additional content output control section 55 includes an output determination unit 551, a list processing unit 552, and a browsing processing unit 553. These functions are implemented primarily as a result of the execution of the program stored in the storage section 22 by the central control section 21 to control the tuner 23, the communication section 24, and so on.

Figure 12:
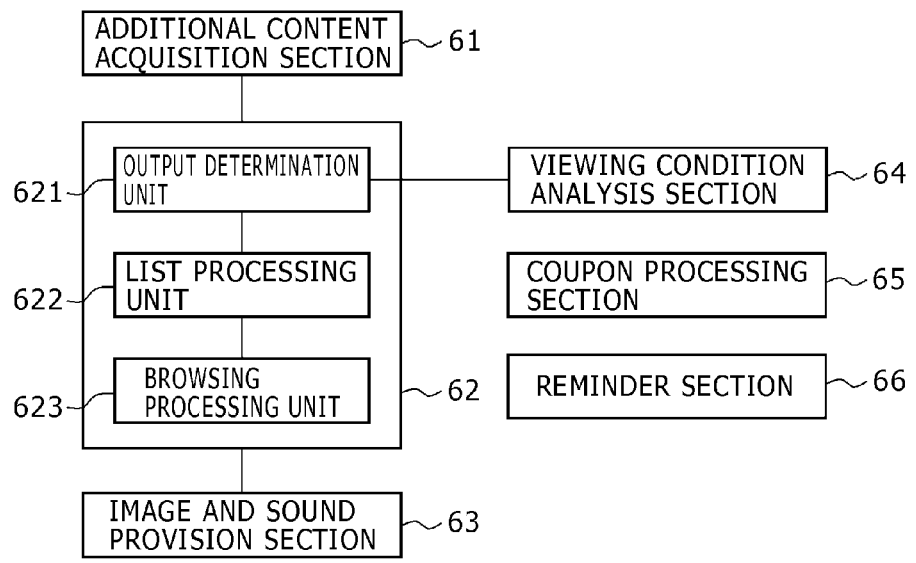
FIG. 12 is a block diagram illustrating an example of configuration of functions achieved by the mobile terminal.

FIG. 12 is a block diagram illustrating an example of configuration of functions achieved by the mobile terminal 3. The mobile terminal 3 functionally includes an additional content acquisition section 61, an additional content output control section 62, an image and sound provision section 63, a viewing condition analysis section 64, a coupon processing section 65, and a reminder section 66. Further, the additional content output control section 62 functionally includes an output determination unit 621, a list processing unit 622, and a browsing processing unit 623. These functions are implemented primarily as a result of the execution of the program stored in the storage section 32 by the central control section 31 to control the communication section 34, and so on.

Here, the TV set 2 and the mobile terminal 3 include the additional content acquisition sections 53 and 61, the additional content output control sections 55 and 62, the image and sound provision sections 54 and 63, and the viewing condition analysis sections 56 and 64, respectively. The commonalties and differences between them will be described later.

Figure 13:
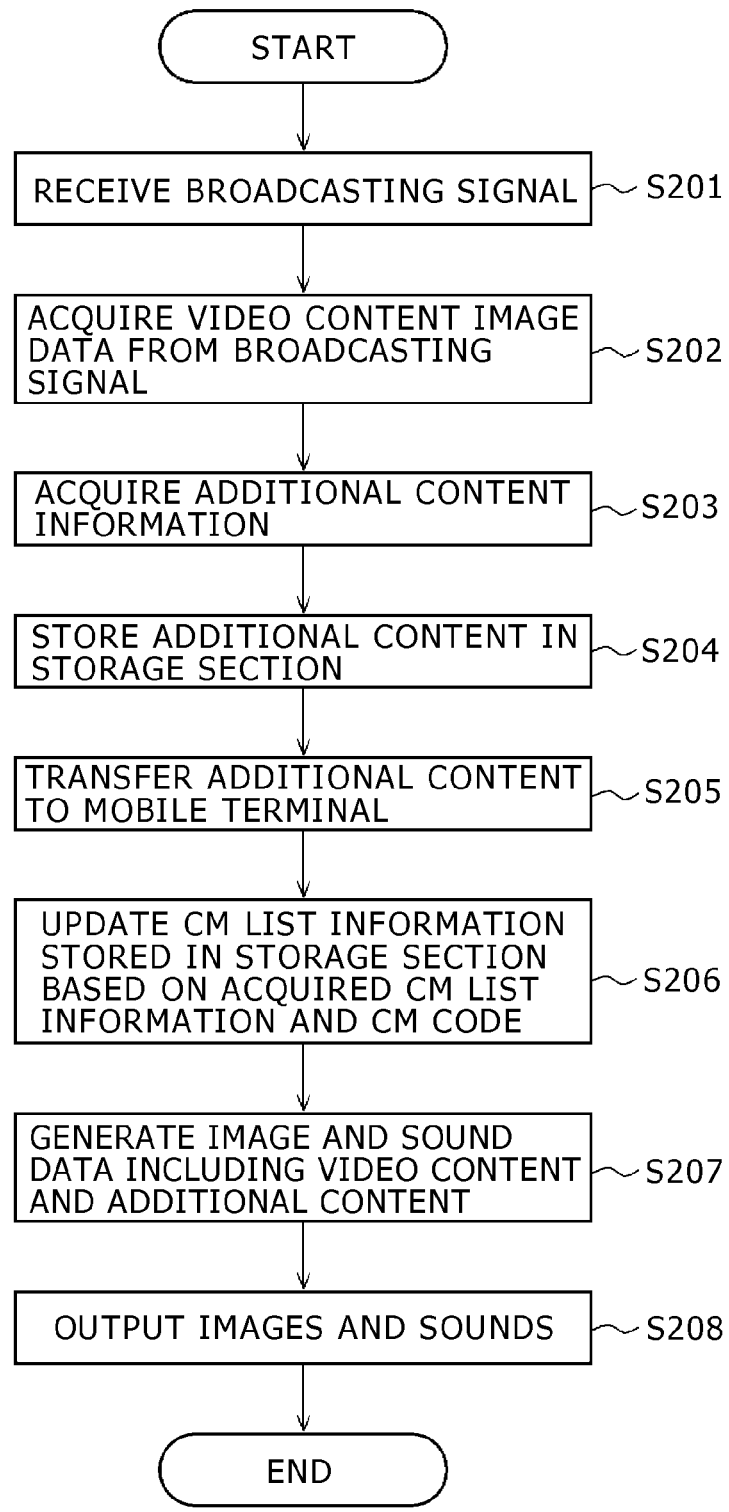
FIG. 13 is a diagram illustrating an example of a processing flow for the TV set to display video content on its screen.

FIG. 13 is a diagram illustrating an example of a processing flow for the TV set 2 to display video content on its screen. FIG. 13 illustrates a flow of a realtime process such as that for acquiring a broadcasting signal or that for displaying video content on the screen. A description will be given below of the broadcasting signal reception section 51, the video content analysis section 52, the additional content acquisition section 53, the image and sound provision section 54, and the additional content transfer section 58 that are related to this process with reference to the processing flow.

The broadcasting signal reception section 51 is implemented primarily by the tuner 23, the central control section 21, and the storage section 22. The broadcasting signal reception section 51 receives a broadcasting signal (step S201). The broadcasting signal is supplied to the broadcasting signal reception section 51 via the receiving antenna 6. The broadcasting signal reception section 51 demodulates the radio waves of the broadcasting signal supplied from the receiving antenna 6.

The video content analysis section 52 is implemented primarily by the tuner 23, the central control section 21, and the storage section 22. The video content analysis section 52 generates video content image data from the demodulated broadcasting signal (step S202). More specifically, the video content analysis section 52 converts the broadcasting signal to data, thus acquiring video content data included in that data. The video content data includes compressed image and sound data. The video content analysis section 52 decompresses the video content data, thus acquiring image and sound data. Further, if the video content is CM content, the video content analysis section 52 acquires the CM code of the CM content to be aired. Although the conversion and decompression of the data are handled by hardware of the tuner 23, these tasks may be implemented as a result of the execution of a program by the central control section 21. It should be noted that the video content analysis section 52 may extract a feature quantity from the images and sounds of the video content and acquire information on, for example, the CM code of the CM corresponding to the feature quantity from a CM database rather than acquiring a CM code from a broadcasting signal.

The additional content acquisition section 53 of the TV set 2 is implemented primarily by the tuner 23, the central control section 21, and the storage section 22. The additional content acquisition section 53 acquires additional content information from the broadcasting signal (step S203). Further, the additional content acquisition section 53 stores the acquired additional content data in the storage section 22 (step S204). More specifically, the additional content acquisition section 53 acquires the additional content data from the data broadcasting area of the data converted from the broadcasting signal. It should be noted that the additional content acquisition section 53 may acquire additional content information from the server 4 associated with the broadcasting station that airs the content played by the TV set 2 via a network such as the Internet 7 rather than acquiring additional content information from the broadcasting signal.

Next, the additional content transfer section 58 transfers the acquired additional content data to the mobile terminal 3 (step 205). In order to transfer the additional content, the TV set 2 and the mobile terminal 3 may be connected in ad hoc mode of a wireless LAN in advance for communication through the wireless LAN. Alternatively, the TV set 2 may be connected to a home LAN for communication through a wireless LAN access point of the home LAN.

The additional content data transferred by the additional content transfer section 58 is received and acquired by the additional content acquisition section 61 of the mobile terminal 3. Here, the additional content acquisition section 61 is implemented primarily by the central control section 31, the communication section 34, and the storage section 32. It should be noted that the additional content acquisition section 61 may acquire the additional content data by downloading it from the server 4 via the Internet 7.

The CM list updating section 57 is implemented primarily by the central control section 21 and the storage section 22. The CM list updating section 57 updates the CM list information records stored in the storage section 22 based on the CM list information included in the additional content acquired by the additional content acquisition section 53 and the CM code included in the video content (step S206). For example, if the CM list updating section 57 acquires the CM list information as additional content, the CM list updating section 57 overwrites the delivered information to the records for the time zone included in the CM list information that is included in the additional content to be delivered. Further, the CM list updating section 57 overwrites the CM codes included in the CM content that was already aired to the records in that time zone. In the latter case, the CM list updating section 57 may acquire information such as titles other than the CM codes from the server 4 or from a database that has been downloaded in advance, using the CM codes as keys and overwrite these pieces of information to the records.

The image and sound provision section 54 is implemented primarily by the central control section 21, the storage section 22, the display panel 26, and the speaker 27. The image and sound provision section 54 generates image and sound data that includes the video content and additional content based not only on the video content data acquired by the video content analysis section 52 but also on control exercised by the additional content output control section 55 (e.g., data to be displayed that is output from the additional content output control section 55) which will be described later (step S208).

A description will be given next of the functions related to the process configured to control the display of additional content.

The viewing condition analysis section 56 of the TV set 2 is implemented primarily by the camera 25, the central control section 21, the storage section 22, and the communication section 24. The viewing condition analysis section 64 of the mobile terminal 3 is implemented primarily by the central control section 31, the storage section 32, and the communication section 34. The viewing condition analysis sections 56 and 64 analyze the user's viewing condition. Here, the term "user's viewing condition" refers, for example, to a condition indicating the extent to which the user's attention is focused on the video content, the main part, shown on the TV set 2 or to a condition in which the user should desirably be focused on the video content.

Three conditions are possible as the extent to which the user is focusing his or her attention on the video content. First, the user is, for example, in front of the TV set 2 (being close to the TV set 2 is also acceptable; the same is true hereafter) and concentrating on watching the video content on the TV set 2. Second, although in front of the TV set 2, the user is viewing the TV set 2 while at the same time doing something else. Third, the user is away from the TV set 2. In order to determine in which of these conditions the user is, each of the viewing condition analysis sections 56 and 64 analyzes whether or not the user is in front of the TV set 2, whether he or she is operating the mobile terminal 3, or whether the user's line of sight is directed toward the TV set 2.

More specifically, the determination as to whether or not the user is in front of the TV set 2 may be made as follows. The viewing condition analysis sections 56 and 64 may make this determination by determining the distance between the TV set 2 and the mobile terminal 3 based on the intensity of radio waves of the other party received by the mobile phone 3 and the TV set 2 associated with the user. Alternatively, the viewing condition analysis sections 56 and 64 may make this determination by determining the degree of correlation between the sounds sampled by the viewing condition analysis section 64 and the sounds output from the TV set 2. Still alternatively, the viewing condition analysis section 56 may make this determination by applying a face recognition technique to the image in front of the TV set 2 obtained by the camera 25.

Specifically, the determination as to whether the user is operating the mobile terminal 3 may be made as follows. First, the viewing condition analysis section 64 acquires operation logs such as web content browsing condition that are kept track of by the browsing processing unit 623 of the mobile terminal 3. Further, the viewing condition analysis section 64 analyzes whether the user will operate the mobile terminal 3 in some way or make any operation to browse content of some kind within a given period of time from now. The viewing condition analysis section 64 need only determine that the user is operating the mobile terminal 3 if the mobile terminal 3 is operated within the given period of time. On the other hand, the determination as to whether the user's line of sight is directed toward the TV set 2 may be made by the viewing condition analysis section 56 by applying a face recognition technique to the image in front of the TV set 2 obtained by the camera 25 and detecting the user's line of sight. Here, the browsing processing unit 623 is implemented primarily by the central control section 31, the storage section 32, and the communication section 34. Further, the browsing processing unit 553 of the TV set 2 is implemented primarily by the central control section 21, the storage section 22, the communication section 24, and so on. The browsing processing units 553 and 623 cause the image and sound provision section 54 to provide web or other content and cause the user to browse that content based on the user operation (e.g., text entry, selection of a link URL). Further, the browsing processing units 553 and 623 store, in the storage section 32, the logs about the amount of time the user spent on browsing, the pages he or she browsed, the types of operations he or she made, and so on. It should be noted that the browsing processing unit 623 performs other processes. However, these processes will be described later.

The condition in which the user should desirably be focused on the video content from now (condition in which the user's attention is expected to return to the video content) includes a condition in which the user has finished browsing other content. More specifically, for example, a possible condition would be that the user has finished viewing, for example, web content at the destination of the link that appears when the user selects a ticker information message or one of the titles 72 in the CM list 71. In order to detect this, the viewing condition analysis sections 56 and 64 determine that the user has finished browsing other content if the window of the browsing processing unit 623 or the web content window is closed or becomes inactive.

It should be noted that the viewing condition analysis sections 56 and 64 communicate with each other during operation. For example, one of the viewing condition analysis sections 56 and 64 may acquire the nature of determination made by the other thereof through communication. Alternatively, the viewing condition analysis sections 56 and 64 may exchange measurement results and history information before making determinations, and each thereof may make a determination by itself.

The additional content output control section 55 of the TV set 2 is implemented primarily by the central control section 21 and the storage section 22. The additional content output control section 55 controls the provision of additional content to the user based on the viewing condition acquired by the viewing condition analysis section 56.

Figure 14:
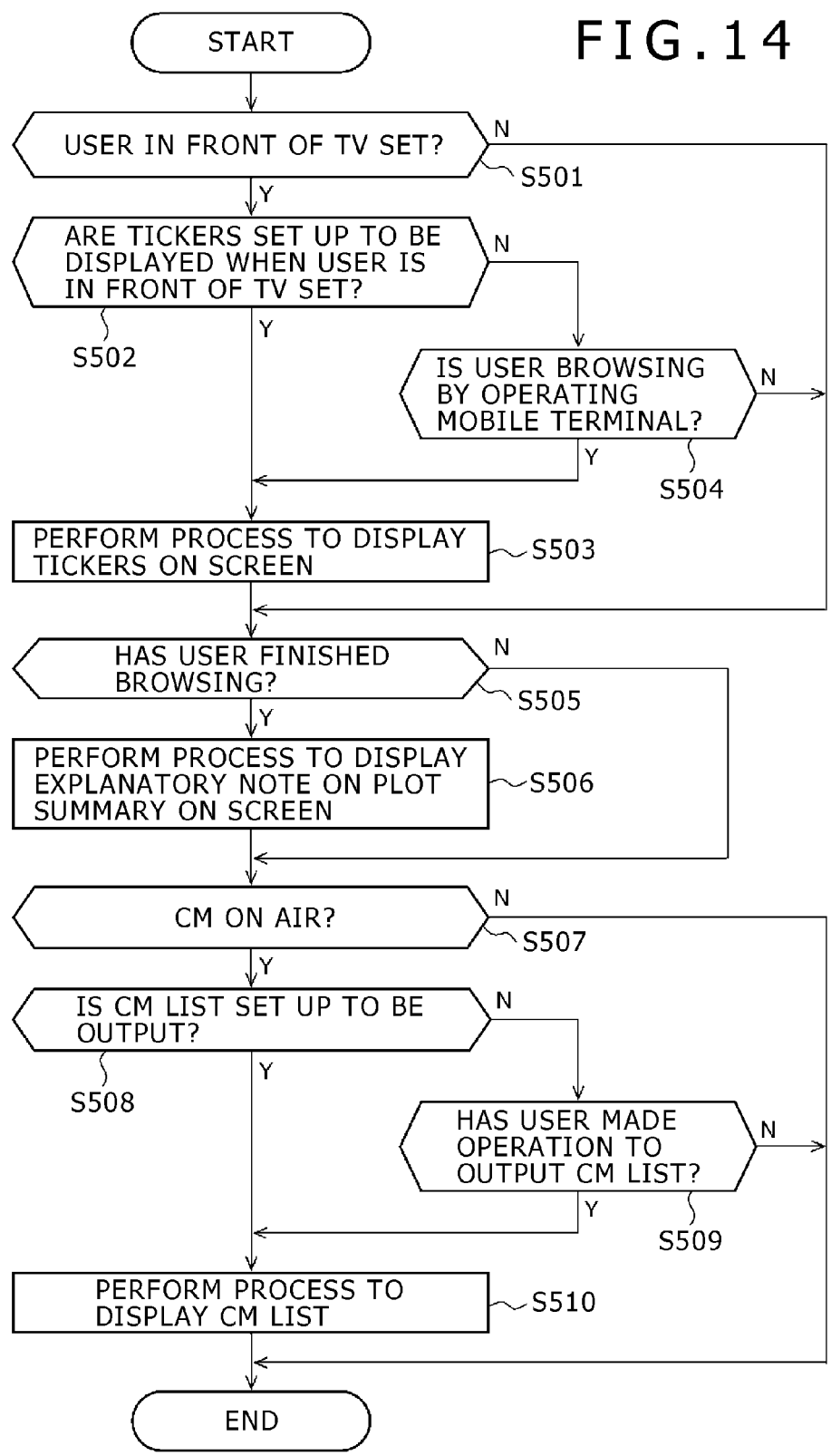
FIG. 14 is a diagram illustrating an example of a processing flow of an additional content output control section of the TV set.

FIG. 14 is a diagram illustrating an example of a processing flow of the additional content output control section 55. First, the output determination unit 551 of the additional content output control section 55 determines whether or not the viewing condition acquired by the viewing condition analysis section 56 includes the presence of the user in front of the TV set 2 (step S501). If the user is not in front of the TV set 2 (N in step S501), the output determination unit 551 skips the processes in steps S502 to S504. When the user is in front of the TV set 2 (Y in step S501), the output determination unit 551 checks whether tickers are set up to be displayed when the user is in front of TV set 2 (step S502). When tickers are set up to be displayed (Y in step S502), the output determination unit 551 determines that ticker information messages are to be output. The list processing unit 552 of the additional content output control section 55 performs a process configured to display tickers on the screen based on the acquired ticker information (step S503). Here, even if tickers are not set up to be displayed (N in step S502), but if it is determined that the user is operating the mobile terminal 3 and browsing content other than the video content (Y in step S504), the output determination unit 551 determines that ticker information messages are to be output and performs the process in step S503. If it is determined that the user is not browsing content other than the video content (N in step S504), the output determination unit 551 skips step S503.

In step S503, the list processing unit 552 controls the image and sound provision section 54 to display, of all the ticker information messages acquired, the message with the time closest to the current time together with a given number of messages before and after that time. Further, the list processing unit 552 determines an appropriate user as a target of each message in accordance with the user's preferences that are specified in advance or estimated from the past operation history and displays the user's icon at the beginning of that message. This contributes to a reduced burden for the user to browse messages.

Further, the user can select a message displayed by the list processing unit 552 and make some kind of action. Among possible actions that can be made by the user in response to a message are checking the message to make it easy to browse the message later, introducing the message to his or her friends through SNS or other means, and searching for a message that was checked before.

Next, the additional content output control section 55 controls the display of additional content based on whether the user has finished browsing content other than the video content currently on the air. More specifically, when the user has finished browsing content (Y in step S505), the output determination unit 551 determines that plot summary information is to be output. The list processing unit 552 performs a process configured to display an explanatory note of the plot summary on the screen (e.g., area where the CM list 71 appears in FIG. 3) based on the plot summary information (step S506). If the user has yet to finish browsing content, or if the user did not browse content in the first place (N in step S505), the output determination unit 551 skips the process in step S506. At this time, the list processing unit 552 exercises control so that, of all the plot summary information, only the records with the past times are displayed.

Next, the additional content output control section 55 controls whether or not to output the CM list 71. First, the output determination unit 551 determines whether or not a CM is being aired now (step S507). Then, if no CM is being aired now (N in step S507), the output determination unit 551 skips the processes in steps S508 to S510. On the other hand, if a CM is being aired now (Y in step S507), the output determination unit 551 further checks a condition. More specifically, if the CM list 71 is set up to be output (Y in step S508), or if the user operates the mobile terminal 3 to output the CM list 71, for example, by selecting a CM within a given period of time from now (Y in step S509) although the CM list 71 is not set up to be output (N in step S508), the output determination unit 551 determines that the CM list 71 is to be displayed. The list processing unit 552 performs a process configured to display the CM list 71 (step S510). It should be noted that if the user makes an operation of some kind on the CM list 71 within the given period of time from now, the output determination unit 551 may determine that the CM list 71 is to be output although a CM is not being aired.

Here, the list processing unit 552 displays, of the CM list 71, information about a given number of pieces of CM content from the past to the future including the current time. Further, in association with the piece of CM content checked by the user, the list processing unit 552 exercises control so that a flag is attached to the item of the CM list information that is stored in the storage section 22, the flag indicating that the item will be checked later, and so that the item in the CM list appears with a mark indicating that the item has been checked. The user can check a piece of CM content in several ways. First, when a piece of CM content is output as video content, the user can check that piece of CM content, for example, by pressing a button on the remote control. In this case, the CM list 71 need not be displayed in advance. Second, the user can check a piece of CM content by checking one in the CM list 71 that currently appears. In this way, the user can check past pieces of content which he or she could not do so by pressing a button. Further, the list processing unit 552 may exercise control so that the CM list 71 scrolls with the progress of time.

The additional content output control section 62 of the mobile terminal 3 is implemented primarily by the central control section 31 and the storage section 32. The additional content output control section 62 controls the provision of additional content to the user based on the viewing condition acquired by the viewing condition analysis section 64.

The nature of the processes performed by the output determination unit 621 and the list processing unit 622 of the additional content output control section 62 of the mobile terminal 3 is largely common to the nature of the processes performed by the output determination unit 551 and the list processing unit 552. However, there are differences therebetween. One of the differences is that the viewing condition is acquired from the viewing condition analysis section 64, and that the image and sound provision section 63 is controlled as to whether to output information. The other difference is that the additional content output control section 62 does not control the display of plot summary information (steps S505 and S506), and, instead switches between pieces of content to be displayed based on whether the user is in front of the TV set 2 when the user selects a ticker information message or a record (title 72) in the CM list 71. It should be noted that it is needless to say that because the mobile device 3 does not display video content due to its small display screen, the image and sound provision section 63 outputs additional content to the display panel or the like of the display operation section 33, for example, in a time line format.

Figure 15:
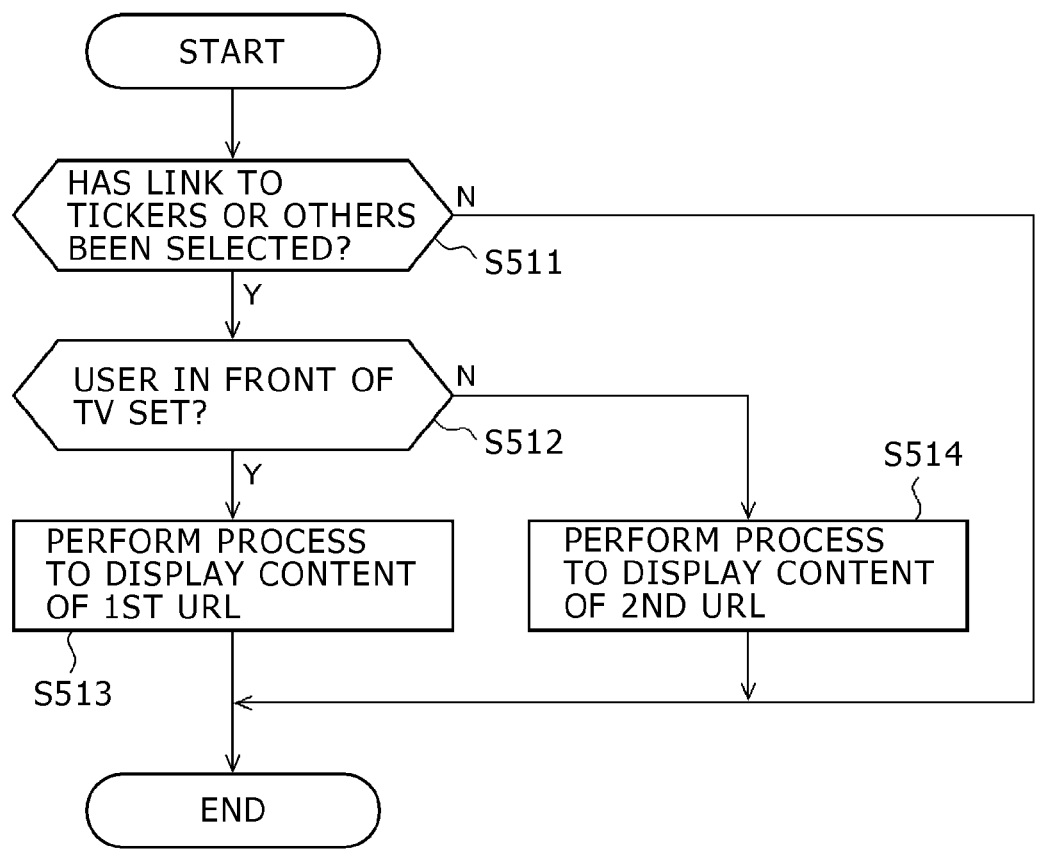
FIG. 15 is a diagram illustrating some of the processes performed by the additional content output control section of the mobile terminal.

FIG. 15 is a diagram illustrating some of the processes performed by the additional content output control section 62 of the mobile terminal 3. The additional content output control section 62 performs the processes shown in FIG. 15 after having performed the processes shared with the additional content output control section 55. When a link such as ticker is selected (step S511), the list processing unit 622 determines whether the user is in front of the TV set based on the viewing condition acquired by the viewing condition analysis section 64 (step S512). When the user is in front of the TV set 2 (Y in step S512), the list processing unit 622 performs a process configured to instruct the browsing processing unit 623 to display the web content of the first URL of the CM list information or the ticker information (step S513). On the other hand, if the user is not in front of the TV set, the list processing unit 622 performs a process configured to instruct the browsing processing unit 623 to display the content of the second URL of the CM list information or the ticker information (step S514). When the user selects either the ticker information or the CM list 71, and when the browsing processing unit 623 receives a URL to display the content, the browsing processing unit 623 performs a process configured to acquire the content of the link destination specified by the URL and display the content on the screen.

Further, when accessing the first or second URL, the list processing unit 622 transmits, to the server 4, access information including the access time and the URL. Here, a plurality of URLs are included in the CM list information and the ticker information in the processes shown in FIG. 15. Instead, however, the list processing unit 622 may transmit information as to whether or not the user is in front of the TV set 2 when sending access information to the server 4 and may acquire, in response thereto, a different URL from the server. In this case, the list processing unit 622 instructs the browsing processing unit 623 to display the content of the link destination specified by the acquired URL.

Among content of a link destination is that provided in the form of rich content such as movie to explain what could not be explained during the broadcasting time of the CM content. Providing such rich content to the user may cause the user's attention to be directed to that rich content, an addition, making it likely that the user's attention may not return to the video content, the main part. For this reason, a URL accessed when the user is in front of the TV set 2 (first URL) contains content that, for example, does not include any movie and is relatively simple and non-time-consuming to browse. On the other hand, a URL accessed if the user is not in front of the TV set 2 (second URL) contains rich content such as movie. This makes it less likely that the user's attention may be diverted away from and not turn back to the video content.

It should be noted that the additional content output control section 55 of TV set 2 may also provide content of a link destination. In this case, for example, only the content of the first URL may be normally provided, and the content of the second URL may be selected only when a special operation is performed at the time of selection such as pressing and holding a button. Alternatively, the display area of the TV set 2 may be divided into a display area for video content and a display area for link destination content.

Further, access information transmitted by the additional content output control sections 55 and 62 includes, for example, information identifying CM content and main feature content, user attributes (e.g., sex and age), information identifying ticker message. The broadcasting station can comprehend in detail the effects of CMs by compiling access information.

On the other hand, a coupon may be provided to a user who browsed content of a link destination such as ticker information message. The coupon processing section 65 is implemented primarily by the central control section 31, the storage section 32, the communication section 34, and so on. The coupon processing section 65 acquires coupon information from the server that transmits a coupon to the mobile terminal 3 of the user who browsed the content of the link destination. Among pieces of coupon information acquired are a coupon image, expiry date, information identifying stores that accept the coupon, a valid/invalid flag (flag is normally valid when a coupon is obtained after browsing of web content). The coupon processing section 65 can display the image (e.g., barcode) of the coupon selected by the user and communicate with cash registers wirelessly, thus allowing the user to receive a discount at the stores using these functions.

It should be noted that the broadcasting station may deliver coupon information, associated, for example, with a ticker information message, in a manner included in a broadcasting signal. In this case, the coupon processing section 65 monitors, for example, whether or not the content of the link destination such as movie has been browsed or whether a CM in the CM list 71 has been selected. If the content has been browsed or the CM has been selected, the coupon processing section 65 validates the coupon associated with the content.

Further, the coupon processing section 65 constantly monitors the position of the mobile terminal 3 using, for example, GPS and notifies the mobile terminal 3 when it is approaching a store that accepts a valid coupon. Among ways to notify the mobile terminal 3 are playing the CM sounds, displaying the CM image on the standby screen, and producing sounds or vibrations.

Still further, the list processing units 552 and 622 may control whether or not to display a ticker information message associated with a coupon in accordance with whether the coupon has been downloaded. Whether or not a ticker information message is associated with a coupon may be determined based on whether or not the URL, a trigger to acquire the coupon, is associated with each message.

The reminder section 66 is implemented primarily by the central control section 31 and the storage section 32. The reminder section 66 provides, to the user, a message prompting the user to browse CM content and acquire and use the coupon if checked CM content is not browsed later for a given period of time. This provides the user with more opportunities to become aware of the CM, thus contributing to enhanced impact.

It should be noted that, in the above description, the TV set 2 having the display panel 26 and the speaker 27 receives a broadcasting signal to display video content. However, the enclosure configured to receive a broadcasting signal and the display panel 26 and the speaker 27 may be separate.

REFERENCE SIGNS LIST

1 Broadcasting station device
2 TV set
3 Mobile terminal
4 Server
5 Transmitting antenna
6 Receiving antenna
7 Internet
11 Additional content input section
12 Broadcasting signal generation section
13 Broadcasting signal transmission section
14 Broadcasting progress data storage section
15 Video content storage section
21, 31 Central control sections
22, 32 Storage sections
23 Tuner
24 Communication section
25 Camera
26 Display panel
27 Speaker
33 Display operation section
34 Communication section
51 Broadcasting signal reception section
52 Video content analysis section
53 Additional content acquisition section
54 Image and sound provision section
55, 62 Additional content output control sections
56, 64 Viewing condition analysis sections
57 CM list updating section
58 Additional content transfer section
61 Additional content acquisition section
63 Image and sound provision section
65 Coupon processing section
66 Reminder section
71 CM list
72 Titles
73 Current selection symbol
551, 621 Output determination sections
552, 622 List processing sections
553, 623 Browsing processing sections

The invention claimed is:

1. A content provision device comprising:
a viewing condition acquisition section configured to acquire a viewing condition of a user viewing video content currently on air and appearing on a display;
a content provision section configured to provide on a mobile terminal, to the user, additional content different from the video content,
wherein the additional content is displayed on a mobile terminal display of the mobile terminal; and
a content control section configured to control provision of the additional content to the user by the content provision section based on the viewing condition,
wherein a first additional content is presented by the content control section on the mobile terminal display when the user is less than or equal to a predetermined distance from the display, and
wherein a second additional content different than the first additional content is presented by the content control section on the mobile terminal display when the user is greater than the predetermined distance from the display.

2. The content provision device of claim 1 further comprising:
an additional content acquisition section configured to acquire, as additional content, information representing a plurality of sentences, each associated with one of a plurality of other pieces of content, wherein
the viewing condition acquisition section detects whether or not the user is in front of the display,
the content control section selects one of the plurality of pieces of content that is associated with the sentence selected by the user of all the plurality of sentences based on whether or not the content provision device is located in front of the display, and
the content control section also controls the content provision section in such a manner as to provide, to the user, the selected piece of content as additional content.

3. The content provision device of claim 2, wherein
the additional content acquisition section acquires the information representing the plurality of sentences transferred by a device configured to demodulate a broadcasting signal that includes the video content and the information representing the plurality of sentences.

4. The content provision device of claim 2, wherein
each of the plurality of sentences is also associated with time, and
the content control section exercises control so that the plurality of sentences are provided to the user based on the associated times.

5. The content provision device of claim 1, wherein
the viewing condition acquisition section detects whether or not the user is browsing content other than the video content currently on the air, and
the content control section exercises control so that the additional content is provided to the user if the user is browsing the content other than the video content currently on the air.

6. The content provision device of claim 1, wherein
the viewing condition acquisition section detects whether the user has finished browsing the content other than the video content currently on the air, and
the content control section exercises control so that information outlining the video content currently on the air is provided to the user as additional content if the user has finished browsing the content other than the video content currently on the air.

7. A non-transitory computer-readable information storage medium storing a program, the program for a computer, including:
acquiring a viewing condition of a user viewing video content currently on air and appearing on a display of a content provision device;
detecting a distance of a mobile device from the content provision device;
providing, to the user, additional content on the mobile terminal having a mobile terminal display different from the video content appearing on the display; and
displaying, on the mobile terminal display, a first additional content if the distance is less than or equal to a predetermined distance, and
displaying, on the mobile terminal display, a second additional content if the distance is greater than the predetermined distance,
wherein the first additional content is different than the second additional content.

8. A content provision method comprising:
acquiring a viewing condition of a user viewing video content currently on air and appearing on a display of a content provision device;
detecting a distance of a mobile device from the content provision device;
providing, to the user, additional content on the mobile terminal having a mobile terminal display different from the video content appearing on the display; and
displaying, on the mobile terminal display, a first additional content if the distance is less than or equal to a predetermined distance, and
displaying, on the mobile terminal display, a second additional content if the distance is greater than the predetermined distance,
wherein the first additional content is different than the second additional content.

9. A content provision device comprising:
a camera configured to detect the presence or absence of a user viewing video content currently on air and appearing on a display of the content provision device;
a content provision section configured to provide on a mobile terminal, to the user, additional content different from the video content,
wherein the additional content is displayed on a mobile terminal display of the mobile terminal; and
a content control section configured to control provision of the additional content to the user by the content provision section based on the detected presence or absence of the user by the camera,
wherein a first additional content is presented by the content control section on the mobile terminal display when the user is detected as being present by the camera, and
wherein a second additional content, different than the first additional content, is presented by the content control section on the mobile terminal display when the user is detected as being absent by the camera.

10. The content provision device according to claim 1 wherein the camera further detects if the user is viewing the display, and, the first additional content is provided to the user only if the user is viewing the display.

* * * * *